(12) United States Patent
Smith

(10) Patent No.: US 9,253,325 B1
(45) Date of Patent: Feb. 2, 2016

(54) ONLINE TECHNICAL SUPPORT MANAGEMENT

(71) Applicant: BBY SOLUTIONS, INC., Richfield, MN (US)

(72) Inventor: Adam Smith, Chanhassen, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 0 days.

(21) Appl. No.: 14/637,118

(22) Filed: Mar. 3, 2015

(51) Int. Cl.
| | |
|---|---|
| *H04M 3/00* | (2006.01) |
| *H04M 5/00* | (2006.01) |
| *H04M 3/51* | (2006.01) |
| *H04M 3/523* | (2006.01) |

(52) U.S. Cl.
CPC .......... *H04M 3/5175* (2013.01); *H04M 3/5235* (2013.01)

(58) Field of Classification Search
CPC . H04M 3/523; H04M 3/5232; H04M 3/5238; H04M 3/58
USPC ............... 379/265.05, 265.01, 265.1, 266.01, 379/265.11, 265.14, 265.07, 266.06, 266.08
See application file for complete search history.

(56) References Cited

U.S. PATENT DOCUMENTS

| | | | |
|---|---|---|---|
| 6,850,613 B2 * | 2/2005 | McPartlan .......... | H04M 3/5232 379/219 |
| 7,139,381 B2 * | 11/2006 | McCormack ......... | H04M 3/523 379/207.02 |
| 7,539,627 B2 | 5/2009 | Schmidt | |
| 8,812,895 B2 * | 8/2014 | Shafiee ............... | G06F 11/2025 714/13 |
| 9,060,208 B2 * | 6/2015 | Rieger ............... | H04N 21/2402 |
| 2010/0325216 A1 | 12/2010 | Singh et al. | |

OTHER PUBLICATIONS

"Erlang (unit)", [online]. Wikipedia®, the free encyclopedia. [retrieved on Apr. 1, 2015]. Retrieved from the Internet: <URL: http://en.wikipedia.org/wiki/Erlang_%28unit%29>, (last modified Feb. 24, 2015), 5 pgs.
Aksin, Zeynep, et al., "The Modern Call Center: A Multi-Disciplinary Perspective on Operations Management Research", *Production and Operations Management*, 16(6), (2007), 665-688.

* cited by examiner

*Primary Examiner* — Thjuan K Addy
(74) *Attorney, Agent, or Firm* — Schwegman Lundberg & Woessner, P.A.

(57) ABSTRACT

Methods and implementations of online technical support management are described herein. In some examples, techniques are described to estimate an allocation of resources (e.g., technical support agents) to consumers (e.g., technical support users), through the definition of desired scenario data inputs, the definition of resource scenario changes, and the generation of a projected scenario to model resource demand and projected queues. A regression analysis may be performed on the projected scenario to determine relationships among variables in the projected scenario. Based on the results of the regression analysis, metrics such as waiting times in the queue (including an average time to answer) may be calculated, and appropriate human and technical resources may be scheduled, re-allocated, or otherwise controlled.

21 Claims, 14 Drawing Sheets

ONLINE TECHNICAL SUPPORT MANAGEMENT

TECHNICAL FIELD

Embodiments described herein pertain to management, scheduling, and prediction of resources used within a computer-assisted technical support environment. Some embodiments relate to staffing and demand calculations performed to coordinate the technical support operations conducted by an online technical support center.

BACKGROUND

Many types of companies operate online and phone-based technical support centers, often referred to as "call centers", to provide technical support to customers and businesses. For example, customers may contact a technical support center of a company (e.g., a retailer, manufacturer, or distributor) to obtain assistance with the customer's use of products sold by the company. Further, some types of technical support centers offer support in the form of customer education, troubleshooting tasks, and service workflows.

As communication technology and computing platforms have improved, many consumers prefer to obtain technical support via an online, computer-based interface, rather than only by telephone. The use of an online, computer-based interface can enable a technical service agent to directly interact with the customer's technology (which may include direct control and intervention to repair or assist the computer or device experiencing the issue).

The use of online, computer-based support interactions allows a technical service agent to provide and manage customer service sessions with multiple users (e.g., concurrently or simultaneously). This provides the benefit of reducing the amount of time for a customer to wait without assistance in a queue, and reducing the amount of time for an agent to resolve simple problems. However, existing techniques do not provide an adequate mechanism to manage and evaluate the number of technical service agents used in a multi-customer environment, or fully allocate the resources used to assist customers on-demand.

DETAILED DESCRIPTION

Figure 1:
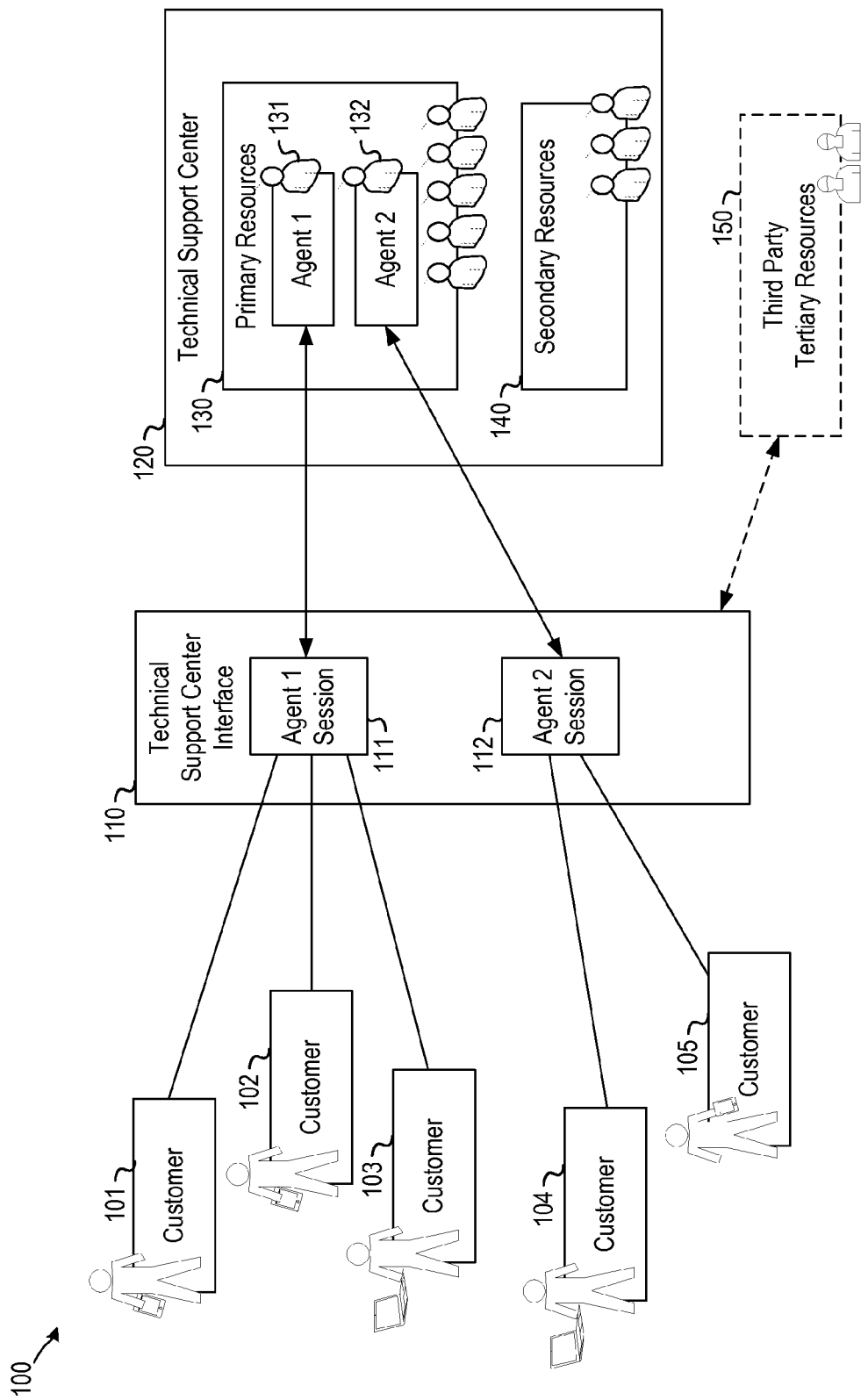
FIG. 1 illustrates example interactions occurring between customers (end users), a technical support center, and technical support resources (agents) via a computer-based technical support interface, according to an example described herein.

The following description and drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some of the examples discussed herein relate to resource management, scheduling, and forecasting in connection with a technical support environment. For example, a technical support environment may be provided from a technical support center that is staffed with a plurality of human or automated agents who each offer support to a plurality of customers. This technical support center may offer support on-demand via computer-based interfaces, such as chat interfaces, website screens, or software application prompts, with these interfaces offering interactivity features such as text capture and output, audio and video capture and output, screen sharing, screen control and remote control processing, and the like. As will be appreciated, the format of the technical support may be provided through any number of these interfaces or communication mediums.

In one example, the described resource management and forecasting model addresses the issues that may arise in a technical support environment from the scheduling and allocation of human resources (e.g., human agents) and technical resources (e.g., bandwidth and processing power, available licenses, available sessions, and the like). In particular, the described resource management and forecasting module can be applied to ensure an ideal client wait time in a computer-interface technical support channel, for a technical support channel that is capable of supporting multiple customers/ clients from each technical support agent in a simultaneous or concurrent manner.

Accordingly, with the present resource coordination techniques, the technical support agent is able to effectively assist multiple users in respective sessions that are conducted during a same period of time. This technical support agent is able to offer suggestions, questions, and assistance among multiple users—instead of serving one user at a time, and incurring long queues that deter or prevent some users from seeking the technical support.

The following resource management and forecasting models in particular addresses the issue of scheduling, based on an ideal client wait time in an online technical support channel that is capable of supporting clients in a simultaneous or concurrent manner. In contrast to some technical support channels (such as phone service banks) that only service one person at a time, the scenarios involving simultaneous or concurrent users provide a much more complex scenario in managing, scheduling and allocating resources to multiple clients.

As described below, the following resource management and forecasting models can be used not only in connection with determining future customer demand, but also for the management of staffing resources (e.g., additional employees or contracted agents), technical resources (e.g., processing, bandwidth, memory resources), and other resources which may vary over a period of time. Accordingly, the resource management and forecasting models provide a mechanism to obtain discrete measurements for allocating resources, in a manner to maximize customer satisfaction and improve resource operations.

FIG. 1 offers an illustration of an example technical support environment 100 in which a plurality of customers 101, 102, 103, 104, 105, individually seek technical support from a technical support center 120 via a technical support center interface 110. The technical support center 120 includes primary resources 130 and secondary resources 140 that are used to fulfill requests within the technical support center interface 110. For example, the primary resources 130 may include regularly scheduled agents (e.g., a first 131 and a second agent 132), whereas the secondary resources 140 may include on-demand or on-call agents.

As shown, the primary resources 130 in the technical support center 120 establish communications with one or more customers, via a set of agent sessions 111, 112 between the agent and the respective customers. For example, the first agent 131 may establish a first agent session 111 within the technical support center interface 110 that offers support to customers 101, 102, 103 in parallel, simultaneously, or concurrently; likewise, the second agent 132 may establish a second agent session 112 within the technical support center interface 110 that offers support to customers 104, 105 in parallel, simultaneously, or concurrently. The number of customers that may be supported by a particular agent session may vary depending on the types of activities performed in the session, the capabilities of the agent, the requirements of the customer, and the like.

In further examples, the technical support center interface 110 may utilize secondary resources 140, such unscheduled or floating-schedule resources that are available on-demand to assist with overflow demand. In a similar fashion, the technical support center interface 110 may utilize third party (tertiary) resources 150. For example, the third party resources may be provided as a result of a customer or agent demand, as a backup to the resources and tools available in the technical support center 120, or to provide content or perform activities that are not available in the technical support center 120.

In the operation of the technical support environment 100, a key consideration may be whether the primary resources 130 or the secondary resources 140 (or even the tertiary resources 150) are deployed to a particular customer. For example, the primary resources 130 may operate based upon schedule or workforce shifts, to provide staffing that is projected to meet customer demands for resources in the technical support center interface. An active management of resource staffing, customer queues, and resource-consumer connections may be deployed to prevent the over-staffing or under-staffing of primary resources 130 (and the efficient use of the secondary resources 140 and the tertiary resources 150).

Figure 2:
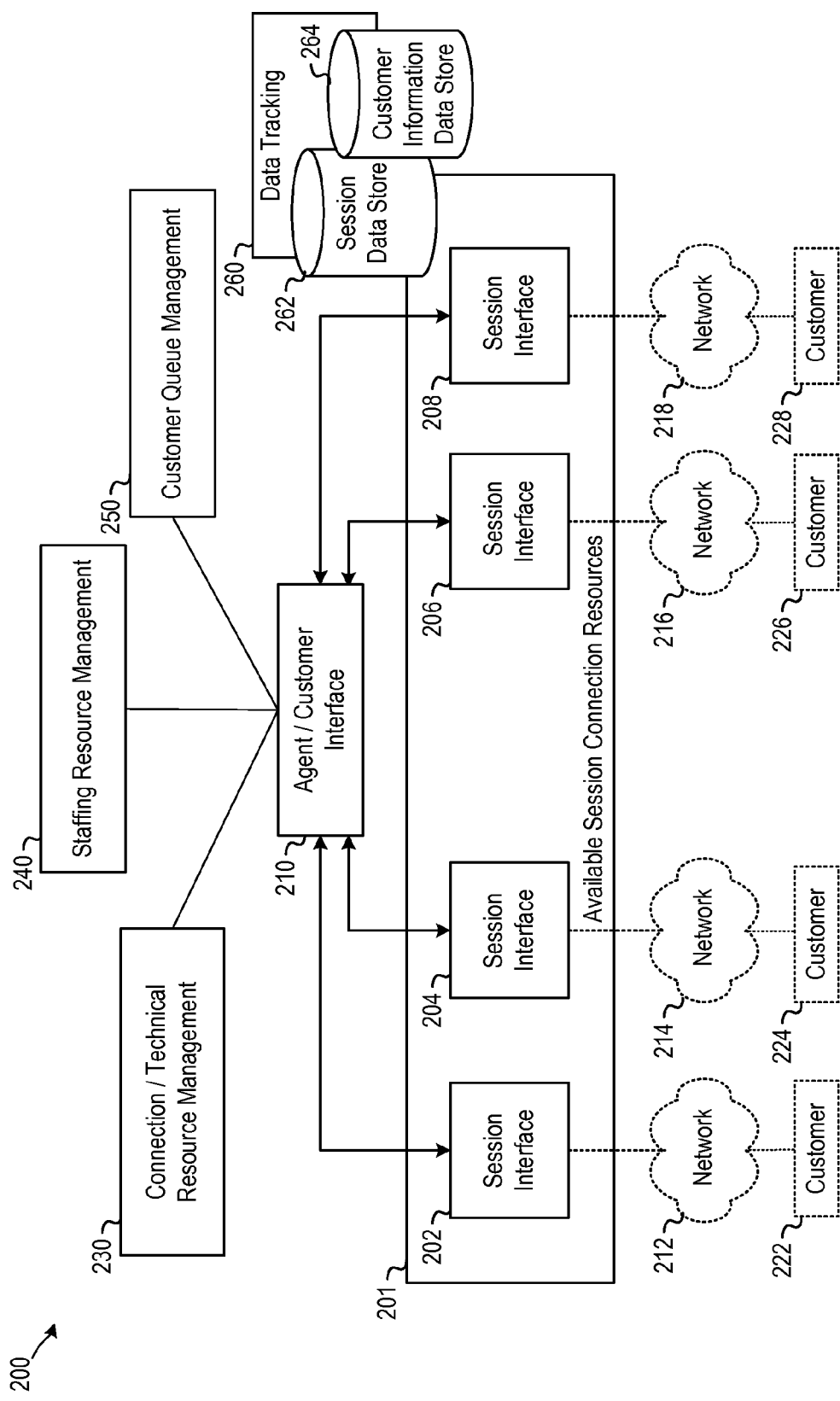
FIG. 2 illustrates data operations and commands being provided and managed in respective customer sessions with the use of technical support management components and interfaces, according to an example described herein.

FIG. 2 provides an example information flow diagram 200 of the connections between an agent/customer interface 210 and the session connection resources 201 that are made available within a technical support environment. As shown, FIG. 2 illustrates operation of the agent/customer interface 210, from the perspective of the management of the particular resources, sessions, and connections in the customer queue. For example, suppose a limited number of session interfaces are made available to customers, such as a limitation on the number of session interfaces 202, 204, 206, 208 available to customers, while other customers (not shown) wait to connect to one of the available session interfaces.

As shown, each of the session interfaces 202, 204, 206, 208 within the session connection resources 201 provides data from an agent/customer interface 210, delivered to respective customers 222, 224, 226, 228 via network connections 212, 214, 216, 218. The agent/customer interface 210 is in turn managed (e.g., controlled, monitored, operated, or modified) by the agent, customer, or computer control, in connection with the following features: connection/technical support resource management functionality 230; staffing resource management functionality 240; and customer queue management functionality 250. Further, the agent/customer interface 210 further integrates with data tracking functionality 260.

For example, the agent/customer interface 210 may use the connection/technical support resource management functionality 230 to manage the number of connections (e.g., active customer connections) or technical resources (e.g., bandwidth, processor, licenses, etc.) between a particular agent and a plurality of customers. For example, a first agent with a greater skill set or experience may have an active session to serve a maximum of four customers; whereas a second agent with a lesser skill set or experience may have an active session to only serve a maximum of three customers. The agent/customer interface 210 also may use features of the customer queue management functionality 250, such as to allow a customer to begin sessions, to terminate sessions, and to manage waiting times and operations. The agent/customer interface 210 also may use features of the staffing resource management functionality 240, to determine whether to allocate new agents to new sessions, whether to allocate existing resources to other staffing areas, whether to request additional resources, and accompanying analysis and projections of staffing and resource distribution levels. Finally, the agent/customer interface 210 may utilize the data tracking functionality 260 to store, persist, or cache information from a particular agent/customer session in a session data store 262, and to access, add, update, and remove information about a particular customer or customer support issue in a customer information data store 264.

While each of the session interfaces 202, 204, 206, 208 are illustrated as separate resources (and separate instances accessed by respective customers), it will be understood that other variations may be applied depending on the type of customer support setting, the type of resource being allocated, and the type of agent/customer interface. For example, a separate instance of the agent/customer interface 210 may be operated for each customer; in other settings, or joint support session (such as training or demonstrations) may be provided from an agent to a plurality of customers simultaneously, concurrently, or jointly.

As further discussed herein, the management of staffing resources, technical resources, and the customer queue may be adapted for the technical support environment with the use of a resource management and forecasting model. The model may be used for a variety of purposes, including generating metrics for current and historical sessions; generating metrics for future and predicted sessions; generating recommendations for present and future staffing sessions; scheduling and accessing secondary resources; providing comparisons to estimated demand and staffing levels; and similar analyses.

In an example, the resource management and forecasting model may be used to calculate a specific metric used for modifying operations of a technical support channel, through the metric defined herein as an "average speed to answer." This metric measures the amount of time that a customer must wait before beginning a customer service session with a resource (e.g., begins interaction with a human agent via an online interface). As will be understood, this measurement of the average speed to answer will have a significant impact on the number of technical support resources used to meet demand, customer perceptions of responsiveness and timeliness, and overall customer satisfaction with the technical support process.

Figure 3:
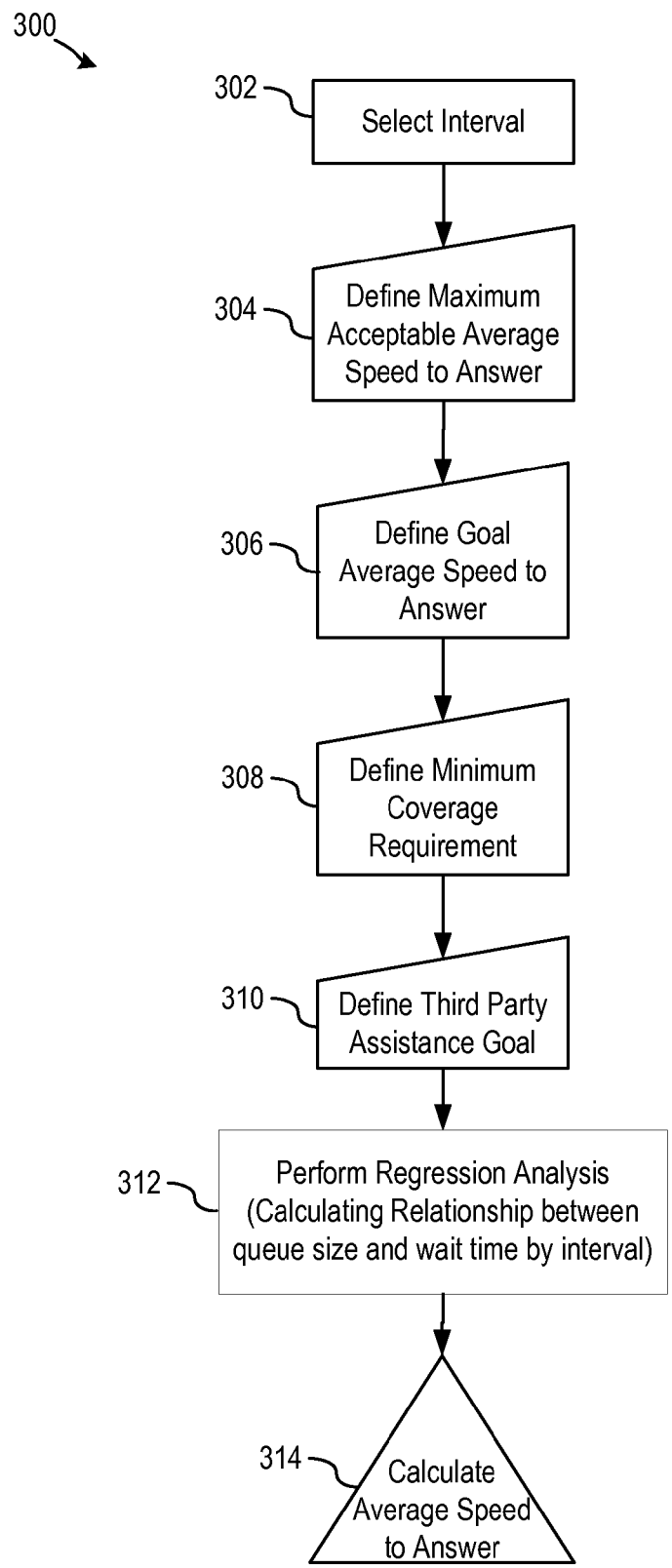
FIG. 3 illustrates a flowchart for a method of defining inputs for a calculation of an average speed to answer in a technical support environment, according to an example described herein.

FIG. 3 provides a flowchart 300 illustrating an example method of defining inputs for a calculation of an average speed to answer in a technical support environment. As shown, FIG. 3 illustrates a series of data collections (data collections 302, 304, 306, 308, 310) used as inputs for the performance of a regression analysis (operation 312). This regression analysis accordingly is used to produce data for a calculation of an average speed to answer (calculation 314).

As shown, the data collections used as inputs to the regression equation may include the selection of an interval (data collection 302) to define a particular portion of time in which to collect data values for. With this selection of a particular portion of time, the data values that may be defined may include: a maximum acceptable average speed to answer (data collection 304); a goal average speed to answer (data collection 306); a minimum coverage requirement for the number of resources (data collection 308); and third party assistance goals for the number of resources to be fulfilled by a third party, such as a secondary or tertiary resource (data collection 310).

Based on the definition of the inputs, a regression analysis may be performed (operation 312). This regression analysis may be performed to calculate a relationship between a queue size and wait time to derive the average speed to answer, based on the desired interval (e.g., the desired interval selected in data collection 302). This regression analysis may also calculate other relationships in connection with data provided from a forecasted or historical volume, productivity, call abandonment, or number of allocated resources.

Other data value variations may be calculated with the performance of the regression analysis and additional data input processing. For example, two primary data points considered may include average wait time and the number of waiting clients in queue by interval; however, other values such as productivity by team, client satisfaction, staffing levels, incoming volume, and abandonment rates, may be used to provide comparison points against a staffing and resource allocation plan for a real-time or prior-period review.

Figure 4:
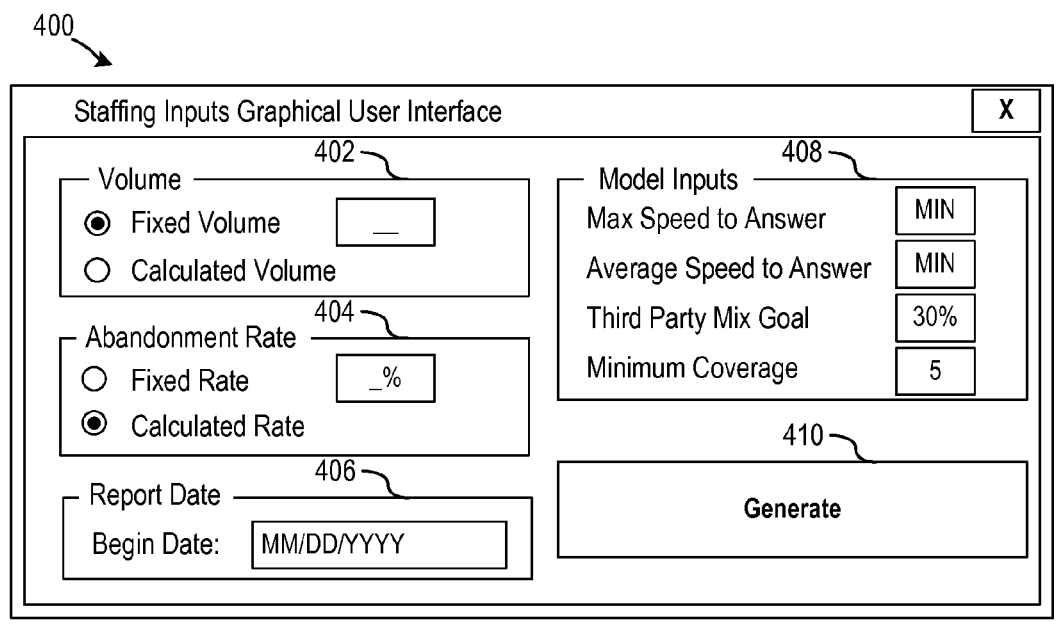
FIG. 4 illustrates a graphical user interface for receiving user inputs for a calculation of an average speed to answer in a technical support environment, according to an example described herein.

FIG. 4 provides an illustration of inputs received in a graphical user interface 400, operating in connection with the calculation of staffing inputs. For example, the graphical user interface may offer graphical user interface inputs to: receive the definition of a volume (graphical user interface input 402) in the form of a fixed volume or calculated volume; to receive the definition of a an abandonment rate in the form of a fixed rate or calculated rate (graphical user interface input 404); and to receive the definition of a report date (graphical user interface input 406) in connection with a time period or point in time in which the interval is located.

Additionally, the graphical user interface 400 may receive a definition of a number of model data inputs (graphical user interface input 408), such as desired maximum speed to answer, a desired average speed to answer, a desired third party mix goal (e.g., a desired number of secondary or tertiary resources to be staffed in connection with the model), and a desired minimum coverage (e.g., minimum number of resources that are staffed at all times in connection with the model). The performance of the operations may be initiated through a graphical user interface input or control (e.g., graphical user interface button 410).

For example, the collection of data evidenced by flowchart 300 and the graphical user interface 400 may be used in connection with a staffing recommendation process for analyzing resource staffing needs, based on a desired average speed to answer measurement. A staffing recommendation process may follow a cyclical process flow in which the process moves from the collection of data, to analysis, to generating recommendations, and back to a collection of data. Each of the staffing recommendation process steps can work together to provide an accurate estimate of staffing requirements and staffing changes, by interval, based on the desired client experience (e.g., based on requirements of satisfying a desired average speed to answer).

The staffing recommendation process may be used in connection with different types of teams that offer support to the same customers or clients, but have different means of scheduling (Static schedules, Flexible schedules, and Fixed Shifts (early, mid, late)). The process may also be varied to handle staffed teams that provide various levels of service to different client groups.

In one example, the model employed by the staffing recommendation process uses the regression analysis to identify the relationship between clients waiting in queue and the average wait time. A peak linear regression formula and an off peak regression formula may be used to improve the quality of the output based on the time of day. In addition to calculating the updated formulas for prospective schedules, the data collected can be compared against past recommendations, used to provide checks of quality, and used to update recommendations to leaders around staffing decisions.

One example of such recommendations may be provided through intraday reporting to evaluate three key elements that impact the client wait time: variance in incoming traffic, variance in productivity, and variance in staffing levels. Based on the outcome of such intraday reporting, the model can identify whether or not additional resources should be used, or whether hours of existing resources should be reduced or reallocated to reduce staffing expenses.

In one example, a manager or other monitoring user designates, supplies, or otherwise provides the following data elements used in the regression analysis recommendation computation. For example, these data elements may be provided in connection with inputs of the graphical user interface 400 of FIG. 4. (While it is possible to use historic data to continue a trend, receiving user-specified data values such as the following data values may allow more control and managerial discretion over the recommendation outputs).

Forecasted volume. This data element may specify the input of volume expected to hit the technical support channel. In other examples, a forecast model could be tied to historic data, to reduce or eliminate the use of a manual entry of this volume data.

Fixed Schedules. This data element may specify the characteristics of a hourly or working schedule for a number of resources and resource availability during those fixed times. For example, in a scenario where fixed, flexible, and static schedules are used, the fixed schedule will be available and will not have scheduling be impacted by the model. The number of resources per interval may be defined manually or calculated based on a certain measurement.

Max Acceptable Speed to Answer. This data element may specify a hard limit that a technical support manager would not want any client to wait longer than. This number would exceed a Goal Average Speed to Answer.

Goal Average Speed to Answer. This data element may specify a target time for answering or initiating a technical support session with a client. For example, there may be a 30-minute Max Acceptable Speed to Answer with a goal of a 15-minute Goal Average Speed to Answer established for all clients.

Minimum Coverage Requirements. This data element may specify a minimum number of individuals or resources for staffing. For example, because of breaks and late night volatility, a manager may want to ensure there is always at least six employees staffed at all times, even when the volume does not support full usage of those resources.

Third Party Goal Mix. This data element may specify the amount of coverage desired from a secondary or tertiary resource. For example, if a third party is used as overflow to receive connections, this data element would specify the goal ratio of the work to send to that third party. In some examples, this value could be specified as a fixed amount of volume that is desired or contractually obligated to send.

Start Hours for Shifts, and Capacity for Shift Start Times. This data element may specify scheduling information for various primary and secondary resources. For example, suppose a third party uses three shifts, a morning, a mid, and a late night. This data element may include information about the start interval for each shift, with the assumption that they each run for a set number of hours (e.g., 8 hours).

Figure 5:
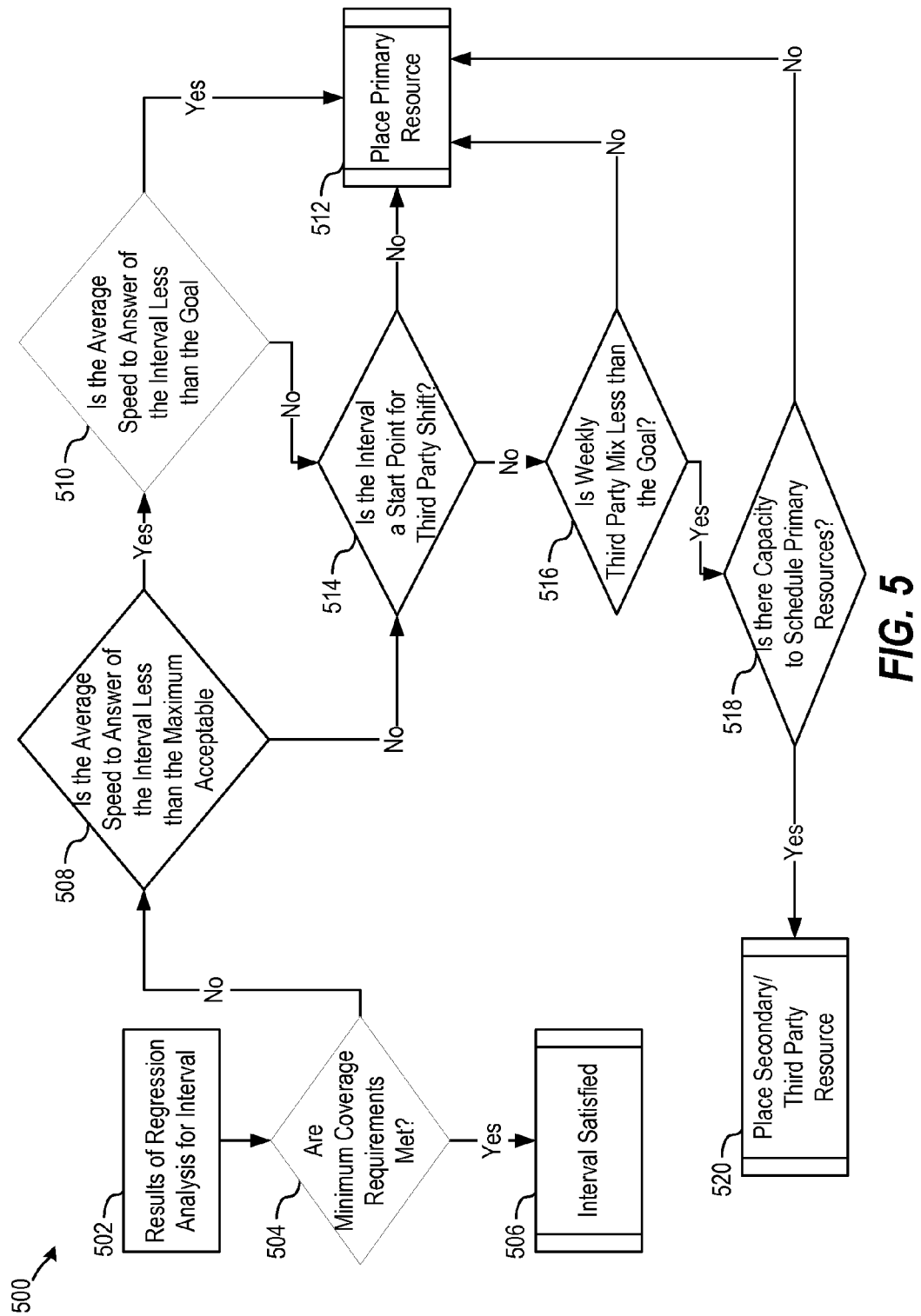
FIG. 5 illustrates a flowchart for a method of verifying and placing resources based on a desired average speed to answer in a technical support environment, according to an example described herein.

FIG. 5 illustrates a flowchart 500 for a method of verifying and placing resources based on a desired average speed to answer in a technical support environment, in connection with the use of the previously described model employed within a staffing recommendation process. Accordingly, the method of FIG. 5 can be used within a staging or planning process where a user interacts with the model (and adjusts scheduling and staffing considerations as a result of the model outputs).

With the data inputs provided, the model starts at a first interval, and starts with a calculation of Average Speed to Answer for that interval, using the input of scheduled resources. At this point, the model compares the resource's productivity for the interval, projecting how many clients will be answered and how many will be left in the queue. The model then uses the number in the queue in the linear equation identified through the regression analysis to calculate the average speed to answer (ASA) for those clients (operation 502).

From the results of the regression analysis, the model will validate whether or not there is at least minimum coverage for staffing requirements (decision 504). If there is at least the minimum number of resources scheduled for the interval, the model will determine that the interval requirements are satisfied (determination 506) which can be followed by an evaluation of a next interval. If at any point along the way the model analysis fails, the model may be triggered to designate additional resources to the interval (through the placement of a primary resource in determination 512, or the placement of a secondary/third party resource in determination 520).

If the average speed to answer is less than the maximum acceptable value for minimum coverage (decision 506), the model will then compare the average speed to answer against the daily goal (decision 510). From this computation, the model will ensure the average speed to answer of all clients thus is less than or equal to the overall goal.

If the average speed to answer is greater than either the maximum acceptable or daily average speed to answer goal, the model will check whether the interval is a starting point for the third party shift based team (decision 514). If the third party is available for a scheduled shift during the interval, the model will check whether or not the volume handled thus far is within the lines of the defined mix for third party (decision 516) (e.g., to verify that the third party is not yet to their mix goal, to be added as an additional resource). If there is capacity, it will add a resource to all intervals related to that shift and start the check over from average speed to answer calculation for that interval.

If the average speed to answer was greater and any of the third party checks failed, or the check to ensure a minimum number of resources are scheduled fails, the system will then place a flexible resource (determination 520) (e.g., a secondary or tertiary resource). At this point, the model can then start the check over from the average speed to answer calculation again, and proceed through each check until each is passed as the model proceeds to the next interval.

The recommendations generated in the flowchart 500 of FIG. 5 can be repeated until all intervals have obtained resource recommendations. Once completed, the results may be provided and logged for future analysis to compare against the actual results. Further, additional analysis and verifications may be performed based on other scheduling considerations and resource availability.

Figure 6:
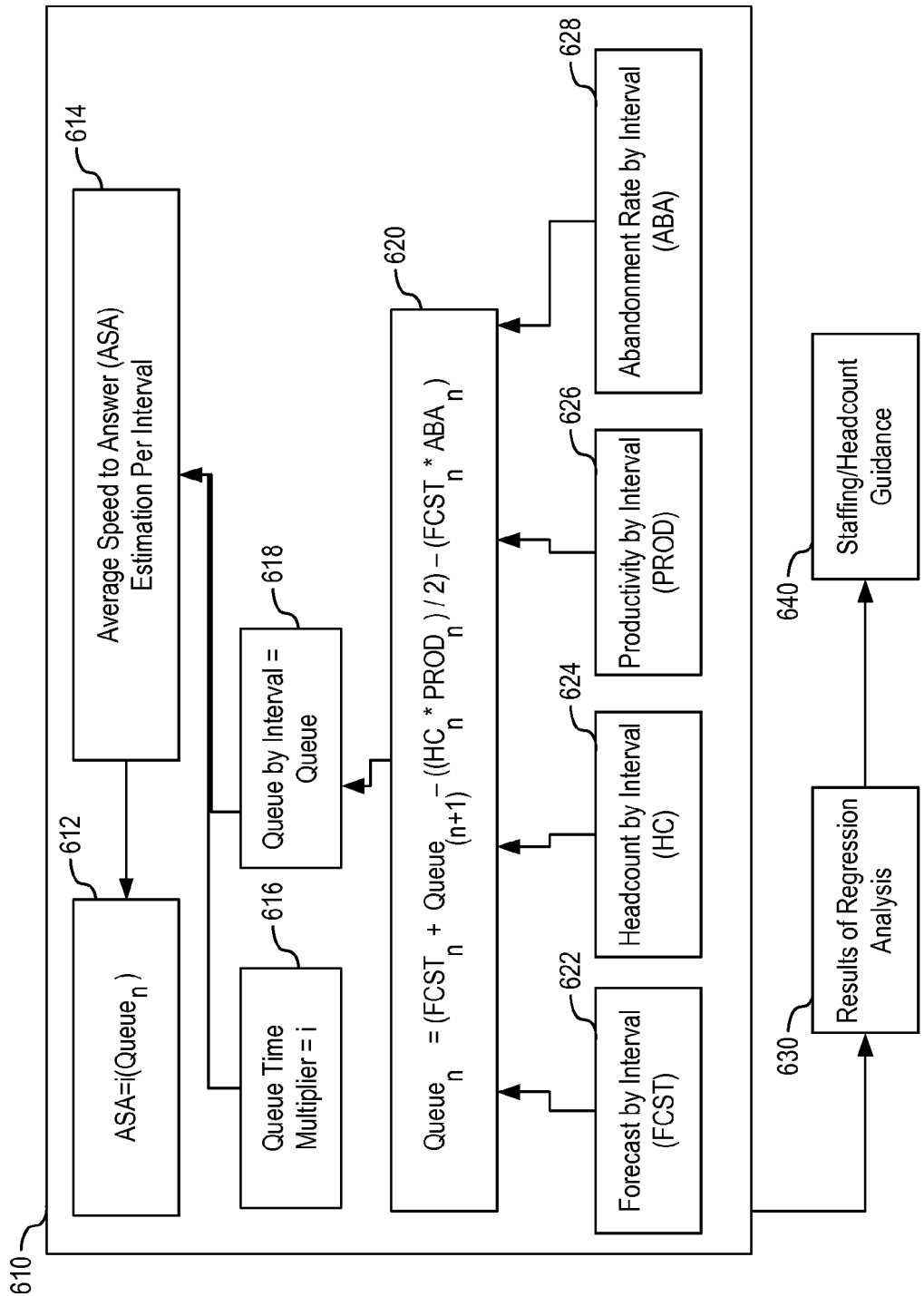
FIG. 6 illustrates a block diagram of inputs factored in a computation of an average speed to answer in a technical support environment, according to an example described herein.

FIG. 6 illustrates a block diagram of example inputs factored in an example computation 610 of an average speed to answer in a technical support environment. As shown, the computation 610 of the average speed to answer 612 for a period of time is produced from an evaluation of an average speed to answer estimation per interval 614. This estimation per interval is produced from evaluation of a projected queue by interval 618 and a queue time multiplier 616. As further shown in FIG. 6, the estimation of the queue 620 for a particular time is based on a predicted evaluation of: forecast by interval 622, headcount by interval 624, productivity by interval 626, and abandonment rate by interval. In further examples, other data elements are considered within this forecast. The results of the computation 630 are ultimately provided to offer staffing and headcount guidance 640, or to offer other evaluative metrics for use in the technical support environment.

Figure 7:
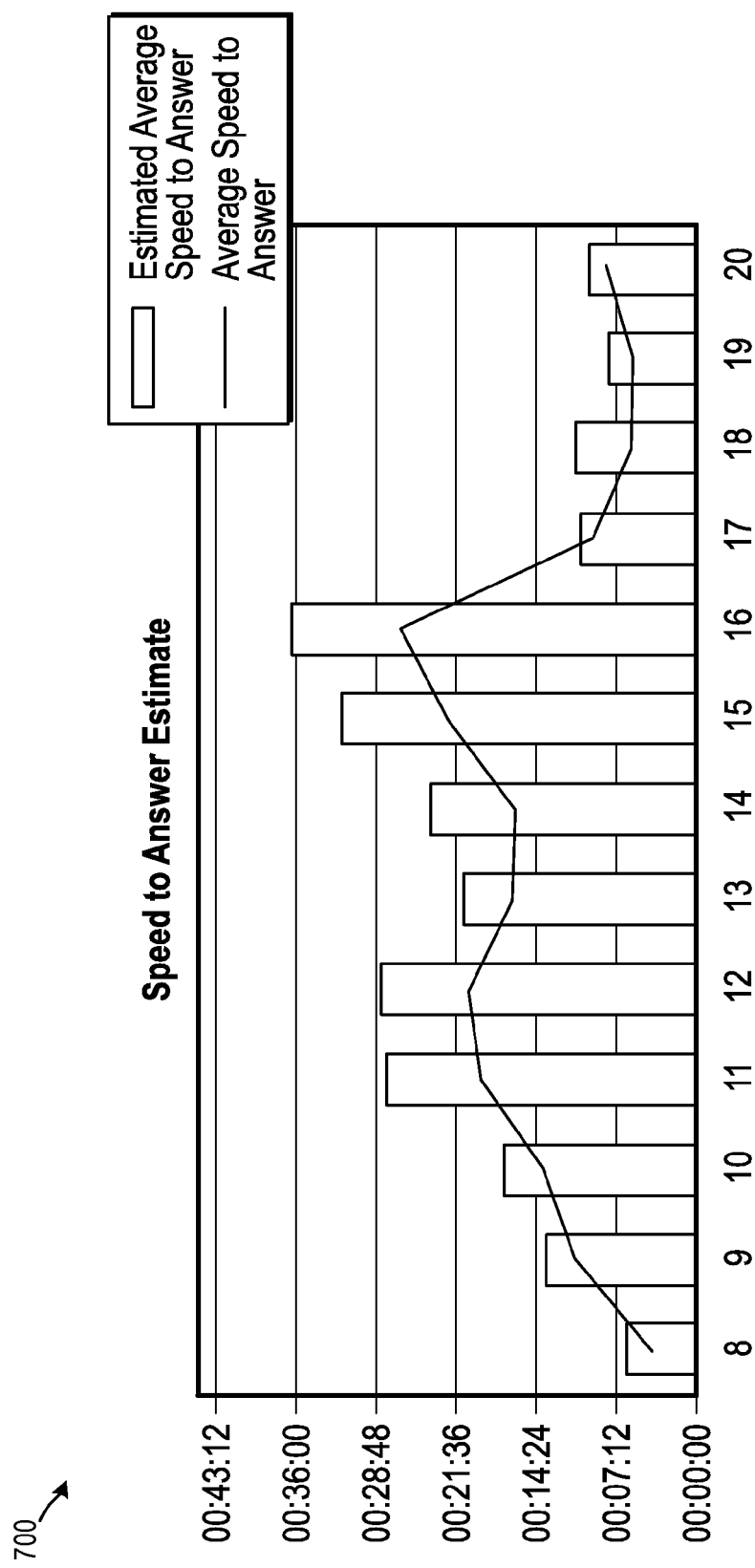
FIG. 7 illustrates a comparison between an estimated average speed to answer and a measured average speed to answer over a period of time within a technical support environment, according to an example described herein.

Based on the computations previously described, various analytics and reports can be generated to provide usable benchmarks and controls of system operations. For example, FIG. 7 illustrates an example comparison 700 between an estimated average speed to answer and a measured average speed to answer, over a period of time, within a technical support environment. As a result of this chart, it can be determined that the deployment of resources was better than projected, such that wait times were particularly less than projections during certain intervals.

Figure 8:
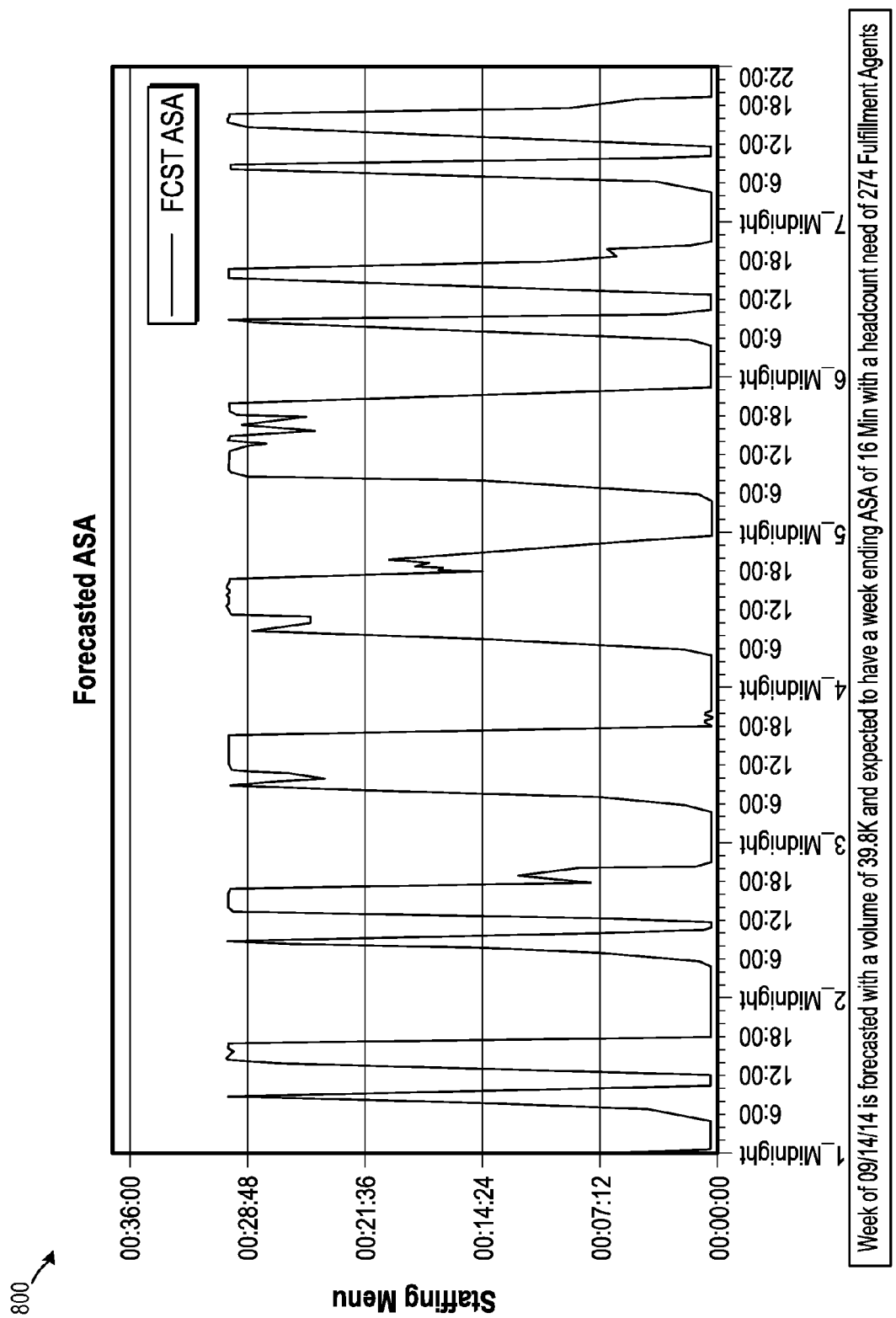
FIG. 8 illustrates a time forecast of an estimated average speed to answer over a period of time within a technical support environment, according to an example described herein.

As another example, FIG. 8 illustrates an example time forecast 800 of an estimated average speed to answer over a period of time (a week) within a technical support environment. For example, suppose that a maximum average speed to answer is set at 30 minutes, with additional resources allocated during peak times to ensure that this requirement is satisfied. As shown, the average speed to answer peaks near this requirement during daily peak times, but is followed by much lower times during daily non-peak times. Such data may be used to coordinate or adjust fixed schedules of staffing resources to match peak times (and likewise, to reduce scheduling in non-peak times).

Figure 9:
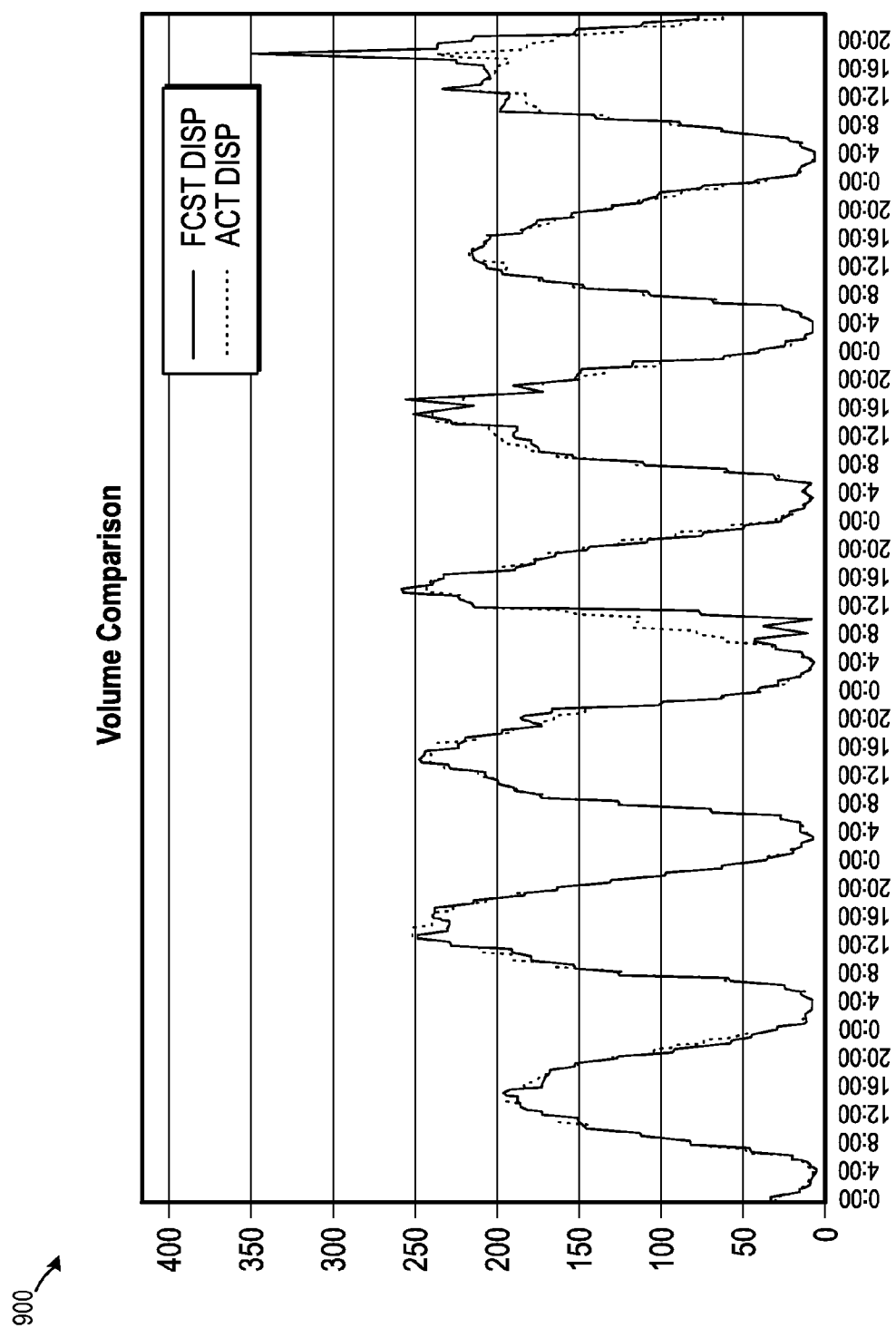
FIG. 9 illustrates a volume forecast comparison for answerable support sessions over a period of time within a technical support environment, according to an example described herein.

As another example, FIG. 9 illustrates an example volume forecast comparison 900 for answerable support sessions over a period of time within a technical support environment. For example, the volume forecast can be compared with the actual volume experienced in a historical period of time, or as a retrospective report to compare forecasted volume to actual volume. This report may be used to indicate the times, days, or conditions where greater call volume is likely to occur (and if specific events or conditions occur that are abnormal or significantly greater than forecast).

Figure 10:
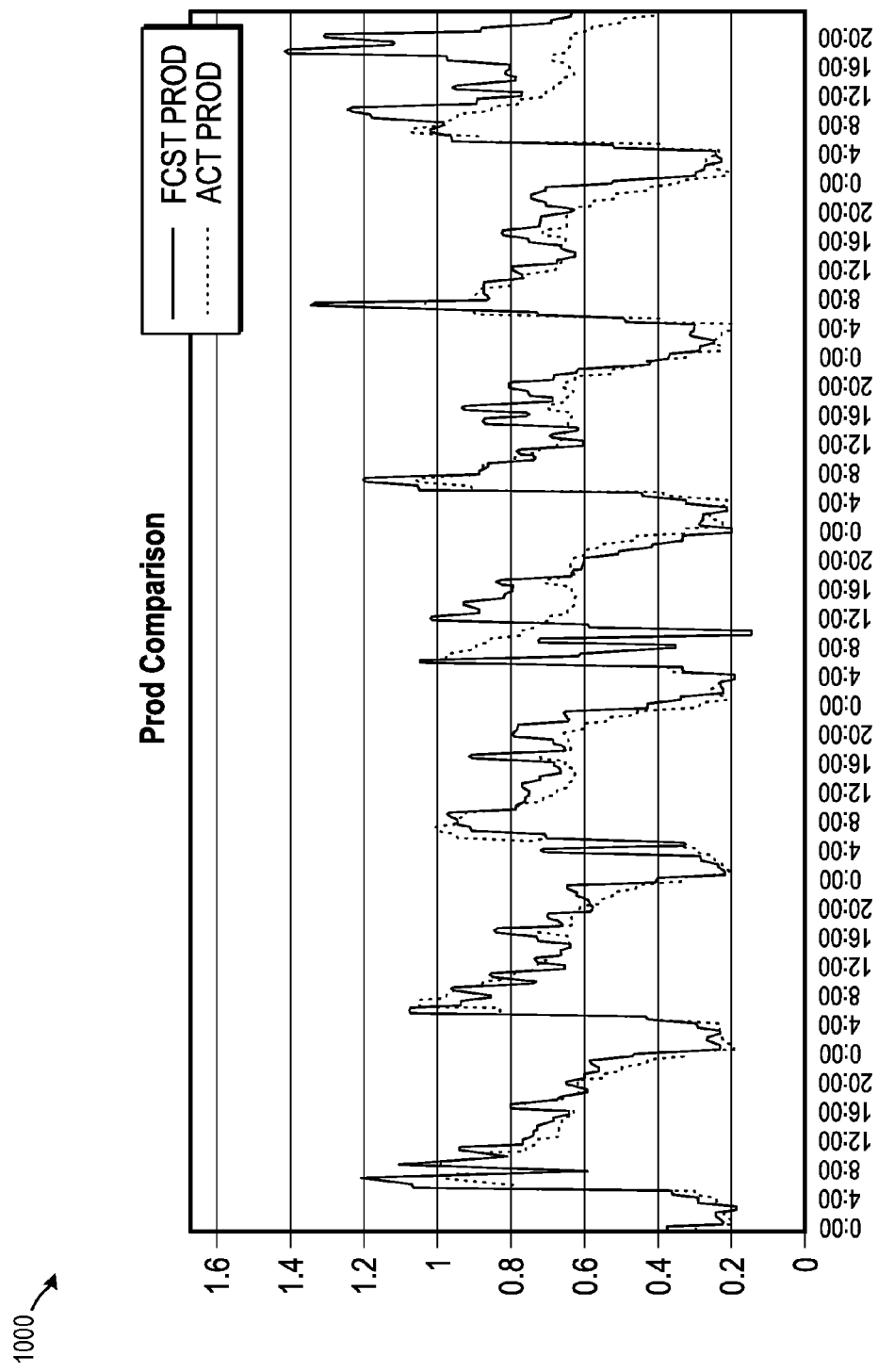
FIG. 10 illustrates a productivity forecast comparison for estimated support sessions over a period of time within a technical support environment, according to an example described herein.

As another example, FIG. 10 illustrates a productivity forecast comparison 1000 for estimated support sessions over a period of time within a technical support environment. For example, the productivity forecast of an average agent to assist a customer over a defined measurement of time may vary depending on the time of day, the time of the shift, the amount of volume, or other factors. The level of productivity by particular agents may also be factored into the average speed to answer calculation to ensure that a more dynamic and accurate picture of technical support performance and throughput is considered.

Figure 11:
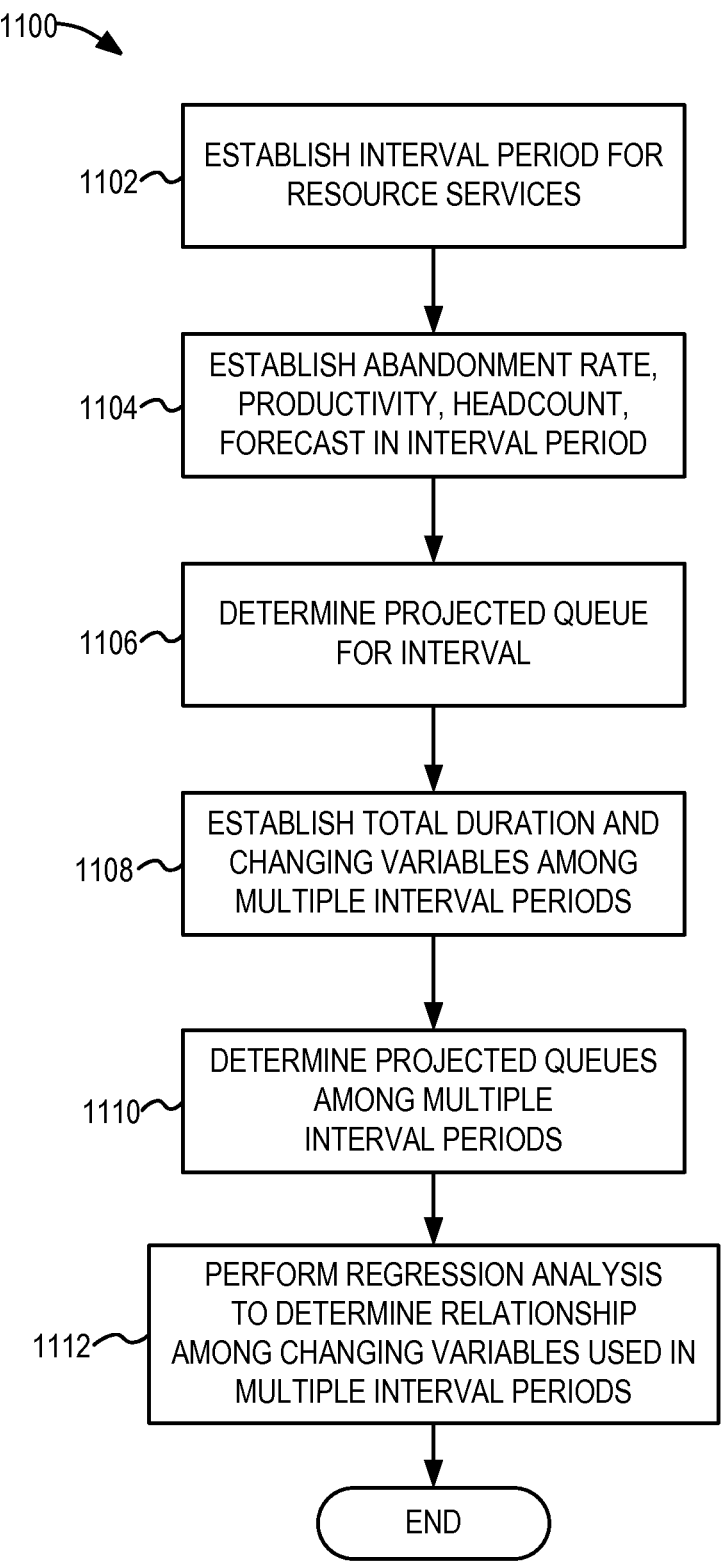
FIG. 11 illustrates a method for performing resource calculations based upon intervals of resource services, according to an example described herein.

FIG. 11 illustrates a flowchart of a method 1100 for performing resource calculations based upon intervals of resource services. As shown, the method 1100 includes the establishment of data values such as a definition of an interval period for resource services (operation 1102) and data elements such as an abandonment rate, productivity, headcount, and forecast in an interval period (operation 1104). From these values, a projected queue can be forecast for the interval (operation 1106) (e.g., using the inputs described in FIGS. 3 and 6).

The method 1100 continues with the definition of a total duration of additional interval periods, and the definition of changing variables among the additional interval periods (operation 1108). From these definitions of the additional interval periods, a determination of projected queues spanning across multiple interval periods may be computed (operation 1110). A regression analysis can then be performed on the projected queues, to determine relationships among changing variables used in the multiple interval periods (operation 1112) and accompanying metrics.

Figure 12:
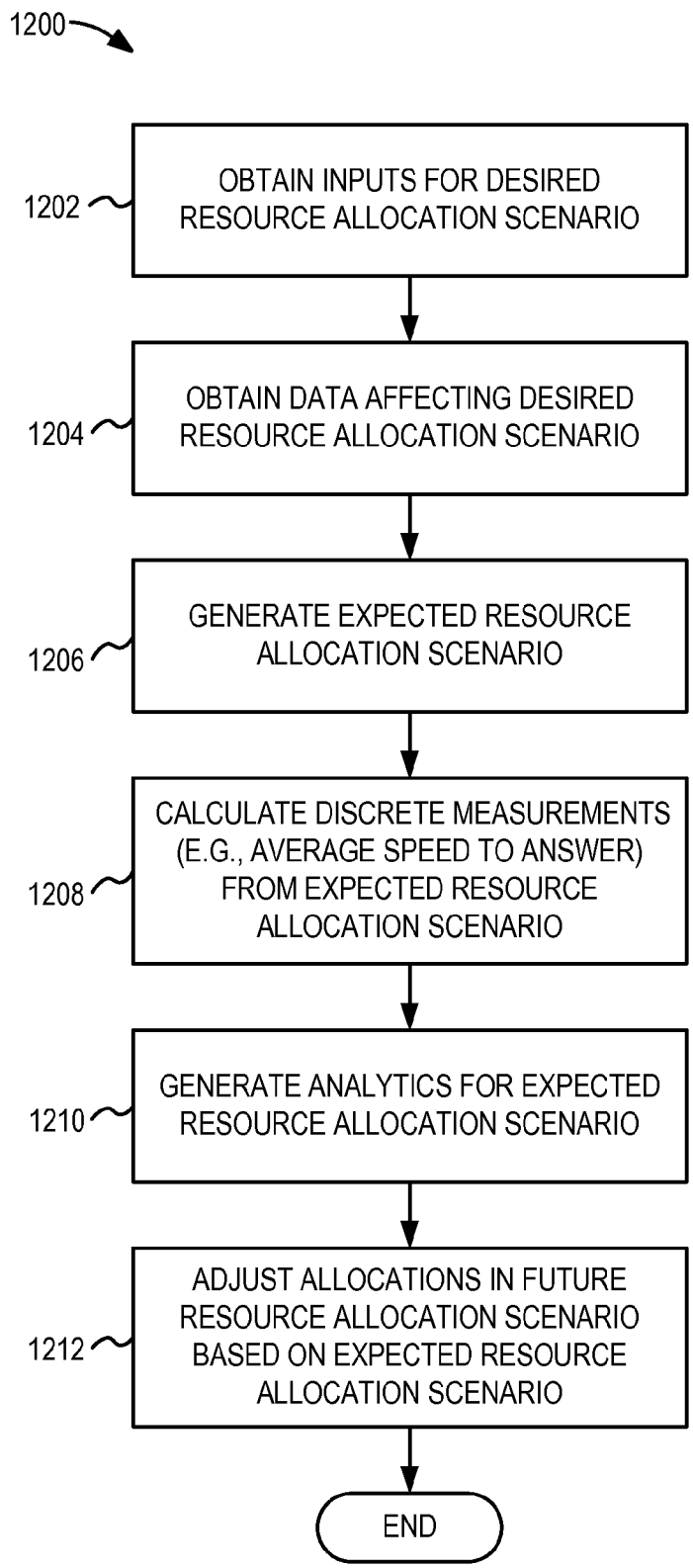
FIG. 12 illustrates a method for generating and implementing resource allocations based upon predictions of resource services, according to an example described herein.

FIG. 12 illustrates a flowchart of a method 1200 for generating and implementing resource allocations based upon predictions of resource services. For example, the method 1200 may be executed in connection with the calculation of an average speed to answer metric that is used to adjust resource levels. However, it will be understood that other discrete measurements may be determined from the projected scenario and used to modify resource allocations.

As shown, the method 1200 includes the provision or access of inputs for a desired resource allocation scenario (operation 1202), such as the definition of data inputs 304, 306, 308, 310 from FIG. 3, or other desired characteristics of the scenario. Further, the method includes the provision or access of data used to affect the desired resource allocation scenario (operation 1204), such as historical data correlating to a particular date, changing characteristics of demand, and other changes to model assumptions. From these data inputs, a projected or expected resource allocation scenario may be generated (operation 1206).

The expected resource allocation scenario may be processed with use of a regression analysis or analytical function to obtain discrete measurements of the expected resource allocation scenario (operation 1208). For example, the regression analysis may calculate a discrete measurement over a period of time (such as an average speed to answer) that is correlated to some measurement of the success of the expected scenario. With use of these discrete measurements and other outputs of the expected scenario, various analytics (e.g., reports, charts, graphs, recommendations, decision verifications) may be generated (operation 1210). As a result of these analytics and other observations of the expected resource allocation, various actual or real-world resource allocations may be adjusted and changed (operation 1212).

While many of the examples described herein refer to online technical support environments and applications, such as technical support offered via an web interface for consumer and business computing devices such as PCs, notebooks, tablets, and smartphones, it will be understood that the techniques described herein may be deployed in a variety of network-based settings that offer allocable resources to devices such as communication terminals, media players, wearable devices, set top boxes, network terminals, and other types of various human-machine interfaces. The types of computing devices that may implement the interfaces described herein may include a variety of desktop, portable, or mobile computing device form factors. Further, the applicability of the resource allocation and mapping discussed herein is not limited to technical support or troubleshooting uses, but the techniques described herein may be extended to other variations of providing customer advice, distributing online goods and services, and coordination between parties within a managed environment.

Figure 13:
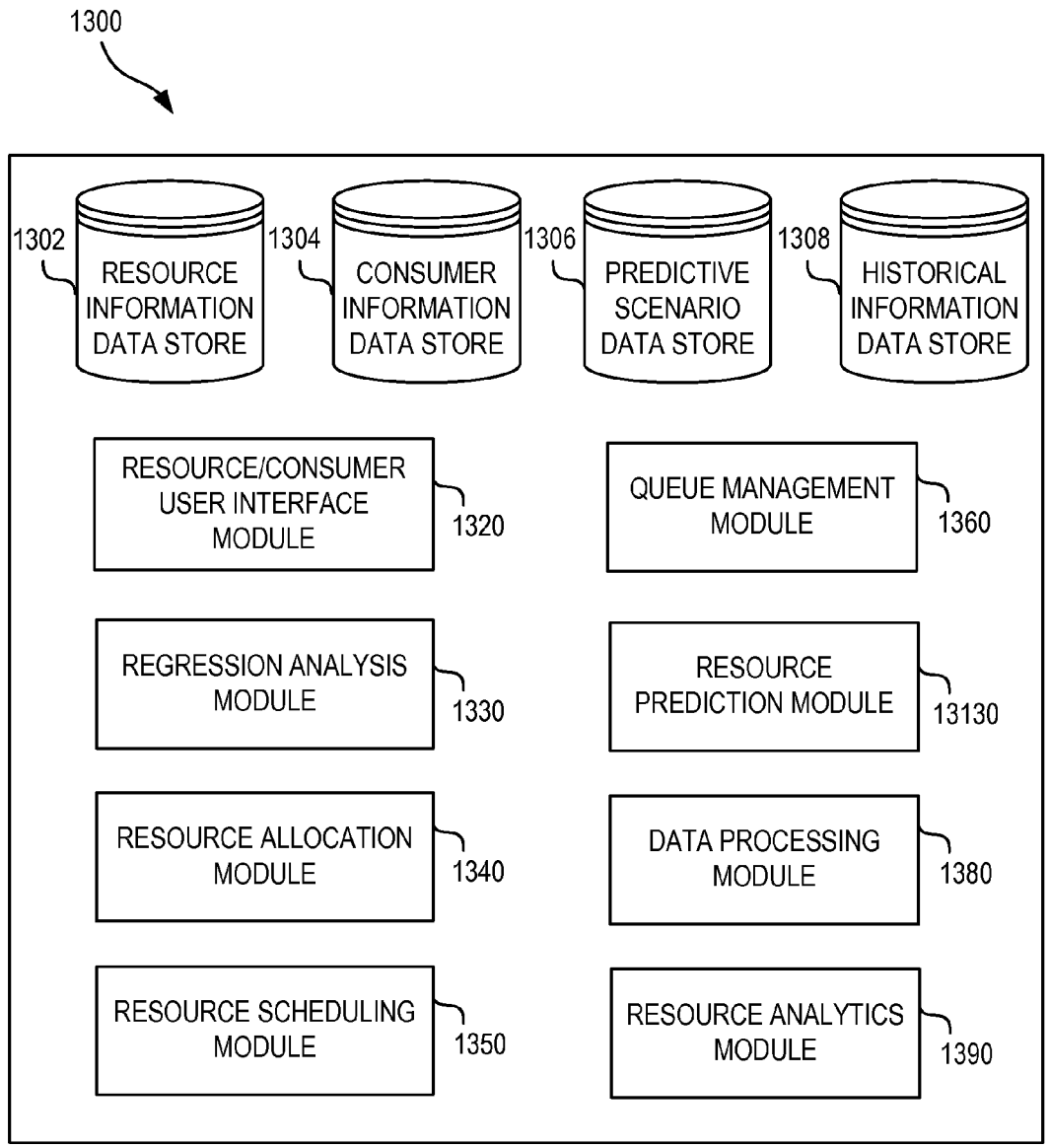
FIG. 13 illustrates a block diagram of components used for processing resource measurements, calculations, and predictions, according to an example described herein.

FIG. 13 illustrates a block diagram 1300 of computing device system components adapted for resource allocation and prediction operations, for operation in the example scenarios described herein. As shown, the computing device system components include a series of data stores 1302, 1304, 1306, 1308 and modules 1320, 1330, 1340, 1350, 1360, 1370, 1380, 1390, which in combination may perform electronic operations to generate and analyze resource usage scenarios such as the technical staffing scenarios described herein.

The illustrated data stores in the block diagram 1300 include: a resource information data store 1302 adapted to store data relating to the characteristics of the resources (such as resource capabilities, schedules, restrictions, productivity, and the like); a consumer information data store 1304 adapted to store data relating to the characteristics of the consumers of the resources (including consumer preferences, requirements, and the like); a predictive scenario data store 1306 adapted to store data relating to estimated or predictive future resource usage scenarios; and a historical information data store 1308 adapted to store data relating to historical or measured resource usage and resource usage statistics provided from the operation of the various monitored resource usage scenarios.

The illustrated modules in the block diagram 1300 include:

A resource and consumer user interface module 1320, adapted to present user interfaces (e.g., user interface 400) to receive user inputs from either resources or consumers, and to offer resource availability or resource exchange (such as a user interface configured to allow a technical support agent to assist a consumer user);

A regression analysis module 1330, adapted to perform a regression analysis upon data available for the consumers or the resources, and to calculate relationships between resource and consumer usage factors (such as a relationship between resource queue size and wait times);

A resource allocation module 1340, adapted to perform the allocation or assignment of resources to particular consumers, and allocate resources from primary, secondary, and tertiary sources to the particular consumers as defined by requirements, rules, and operational constraints;

A resource scheduling module 1350, adapted to perform the assignment of resources with the use of schedules and shifts, and to manage working conditions in connection with consumer conditions, predicted resource usage, and actual resource usage;

A queue management module 1360, adapted to define rules for queue management of resources, and perform real-time direction, allocation, and assignment of consumers to resources within a queue or established waiting period;

A resource prediction module 1370, adapted to perform calculations and produce results from predictive models, to determine forecasts and predictive scenarios for resource usage and allocation;

A data processing module 1380, adapted to perform weighting, collection, and management of data values that are used as inputs to computations of the resource allocations, forecasts, and models; and A resource analytics module 1390, adapted to produce reports, measurements, and other visualizations or products of resource usage metrics, statistics, schedules, and consumption activity.

Embodiments used to facilitate and perform the techniques described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Figure 14:
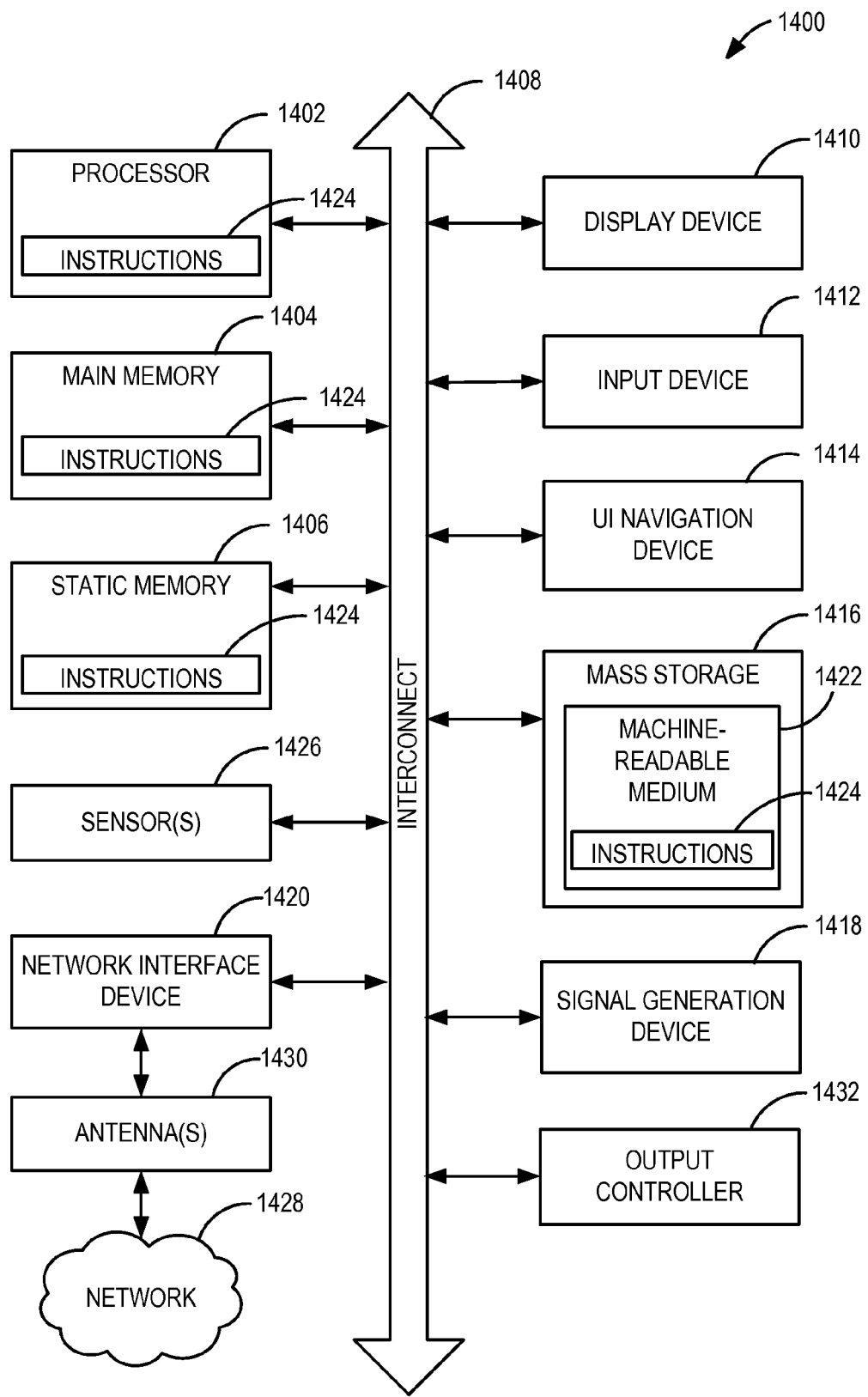
FIG. 14 is a block diagram illustrating operational components of a computing device upon which any one or more of the methodologies herein discussed may be run.

FIG. 14 is a block diagram illustrating a machine in the example form of a computer system 1400, within which a set or sequence of instructions may be executed to cause the machine to perform any one of the methodologies discussed herein, according to an example embodiment. Computer system machine 1400 may be embodied by the system or devices managing, analyzing, or involved in the operations of the technical support center interface 110, the agent/customer interface 210, the resource management components 230, 240, 250, the session connection resources 201 and session interfaces 202, 204, 206, 208, the performance of the regression analysis 312, the graphical user interface 400, the average speed to answer calculation component 610, the output represented by analytic outputs 700, 800, 900, 1000, the system performing the operations of flowchart methods 300, 500, 1100, 1200, or any other electronic processing or computing platform described or referred to herein.

In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1400 includes at least one processor 1402 (e.g., a central processing unit (CPU), a graphics processing unit (GPU) or both, processor cores, compute nodes, etc.), a main memory 1404 and a static memory 1406, which communicate with each other via an interconnect 1408 (e.g., a link, a bus, etc.). The computer system 1400 may further include a video display unit 1410, an alphanumeric input device 1412 (e.g., a keyboard), and a user interface (UI) navigation device 1414 (e.g., a mouse). In one embodiment, the video display unit 1410, input device 1412 and UI navigation device 1414 are incorporated into a touchscreen interface and touchscreen display. The computer system 1400 may additionally include a storage device 1416 (e.g., a drive unit), a signal generation device 1418 (e.g., a speaker), an output controller 1432, a network interface device 1420 (which may include or operably communicate with one or more antennas 1430, transceivers, or other wireless communications hardware), and one or more sensors 1426, such as a global positioning system (GPS) sensor, compass, accelerometer, location sensor, or other sensor.

The storage device 1416 includes a machine-readable medium 1422 on which is stored one or more sets of data structures and instructions 1424 (e.g., software) embodying or utilized by any one or more of the methodologies or functions described herein. The instructions 1424 may also reside, completely or at least partially, within the main memory 1404, static memory 1406, and/or within the processor 1402 during execution thereof by the computer system 1400, with the main memory 1404, static memory 1406, and the processor 1402 also constituting machine-readable media.

While the machine-readable medium 1422 is illustrated in an example embodiment to be a single medium, the term "machine-readable medium" may include a single medium or multiple media (e.g., a centralized or distributed database, and/or associated caches and servers) that store the one or more instructions 1424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1424 may further be communicated (e.g., transmitted or received) over a communications network 1428 using a transmission medium via the network interface device 1420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the configurations recited by the claims. Each of the examples in the claims may stand on its own, or may be combined in any permutation or combination with any one or more of the other examples provided below or throughout the present disclosure.

What is claimed is:

1. A method for estimating an allocation of resources to consumers, the method performed by a computing device having a processor and a memory, the method implemented by operations performed using the processor and the memory, with the operations comprising:
   obtaining data that defines a desired scenario for an allocation of the resources to consumers, wherein the allocation of the resources in the desired scenario includes a concurrent deployment of an individual resource of the resources to multiple consumers of the consumers;
   obtaining data that changes the desired scenario for a usage of the resources by the consumers, wherein the desired scenario is changed based on characteristics of a projected queue including variable wait times for the usage of the resources by the consumers, and wherein the consumers enter the projected queue to attempt usage of the resources at varying times;
   generating a projected scenario for the allocation of the resources to the consumers, the projected scenario including the usage of the resources by the consumers at the varying times based on the allocation of the resources to resource demand from the projected queue;
   performing a regression analysis on the projected scenario to determine relationships among variables affecting the projected scenario; and
   scheduling the resources using the relationships obtained from among the variables analyzed in the projected scenario.

2. The method of claim 1, comprising, performing the method for estimating the allocation of resources for a plurality of time intervals, wherein the scheduling of the resources is performed to coordinate scheduling of the resources among the plurality of time intervals.

3. The method of claim 2, wherein the relationships among the variables affecting the projected scenario change over the plurality of time intervals, and wherein the scheduling of the resources is performed to meet requirements of the desired scenario over the plurality of time intervals.

4. The method of claim 1, comprising, calculating an average speed to begin a resource session between an available resource and a requesting consumer, the average speed to begin the resource session based on averages of the time spent in the projected queue in the projected scenario, wherein the scheduling of the resources is performed based on the average speed to begin the resource session.

5. The method of claim 4, wherein the average speed to begin the resource session is an average speed to answer, the average speed to answer defined as an average time predicted for the requesting consumer to leave the projected queue and the available resource to start the resource session with the requesting consumer, in a technical support session between the available resource and the requesting consumer.

6. The method of claim 5, wherein the data that defines the desired scenario includes data values that define: a maximum acceptable average speed to answer, a goal average speed to answer, and a minimum coverage level for the resources.

7. The method of claim 1, wherein the data that changes the desired scenario includes data values that define a third party assistance goal for assistance by third party resources, wherein the scheduling of the resources includes determining scheduling of a primary resource and a secondary resource, the secondary resource provided by the third party resources.

8. The method of claim 1, wherein the resources are technical support agents and wherein the consumers are users seeking technical support from the technical support agents, wherein a respective agent of the technical support agents provides assistance to multiple of the users with concurrent technical support sessions to multiple of the users in an online user interface, wherein the technical support agents are scheduled to ensure assistance to the users based on time metrics including an average speed to answer, wherein the average speed to answer defines an average speed to begin a technical support session between one of the technical support agents and one of the users.

9. A non-transitory machine-readable medium including instructions to estimate an allocation of resources to consumers, the instructions which when executed by a computing machine cause the computing machine to perform operations that:
   process inputs for a desired scenario for an allocation of the resources to consumers, wherein the allocation of the resources in the desired scenario includes a concurrent deployment of an individual resource of the resources to multiple consumers of the consumers;
   process data that affects the desired scenario for a usage of the resources by the consumers, wherein the desired scenario is changed based on characteristics of a projected queue including variable wait times for the usage of the resources by the consumers, and wherein the consumers enter the projected queue to attempt usage of the resources at varying times;
   generate a projected scenario for the allocation of the resources to the consumers, the projected scenario including the usage of the resources by the consumers at the varying times based on the allocation of the resources to resource demand from the projected queue;
   perform a regression analysis on the projected scenario to determine relationships among variables affecting the projected scenario; and
   calculate an average speed to begin a resource session between an available resource and a requesting consumer.

10. The machine-readable medium of claim 9, wherein the instructions cause the computing machine to perform operations that:

schedule respective resources using the relationships obtained from among the variables of the regression analysis affecting the projected scenario, the respective resources scheduled at least in part based on characteristics of the desired scenario for the usage of the resources by the consumers.

11. The machine-readable medium of claim 10, wherein the instructions cause the computing machine to perform operations that estimate the allocation of resources for a plurality of time intervals, wherein the scheduling of the resources is performed to coordinate scheduling of the resources among the plurality of time intervals, wherein the relationships among the variables affecting the projected scenario change over the plurality of time intervals, and wherein the scheduling of the resources is performed to meet requirements of the desired scenario over the plurality of time intervals.

12. The machine-readable medium of claim 11, wherein the instructions cause the computing machine to perform operations that calculate the average speed to begin the resource session between an available resource and a requesting consumer, the average speed to begin the resource session based on averages of the time spent in the projected queue in the projected scenario, for a technical support session between the available resource and the requesting consumer.

13. The machine-readable medium of claim 9, wherein the data that defines the desired scenario includes data values that define: a maximum acceptable average speed to answer, a goal average speed to answer, and a minimum coverage level for the resources.

14. The machine-readable medium of claim 9, wherein the data that changes the desired scenario includes data values that define a third party assistance goal for assistance by third party resources, wherein the scheduling of the resources includes determining scheduling of a primary resource and a secondary resource, the secondary resource provided by the third party resources.

15. The machine-readable medium of claim 9, wherein the resources are technical support agents and wherein the consumers are users seeking technical support from the technical support agents, wherein a respective agent of the technical support agents provides assistance to multiple of the users with concurrent technical support sessions to multiple of the users in an online user interface, wherein the technical support agents are scheduled to ensure assistance to the users based on time metrics including an average speed to answer, wherein the average speed to answer defines an average speed to begin a technical support session between one of the technical support agents and one of the users.

16. A computing device comprising:
a processor and a memory; and
a resource prediction module component implemented by the processor and memory, the resource prediction module implemented to perform operations that determine a projected scenario for an allocation of resources to consumers, the projected scenario to evaluate the usage of the resources by the consumers at varying times based on an allocation of the resources to meet resource demand from a projected queue, wherein the projected scenario is established from characteristics of the projected queue for use of the resources;
a regression analysis module component implemented by the processor and memory, the regression analysis module implemented to perform operations that perform a regression analysis on the projected scenario to determine relationships among variables affecting the projected scenario; and
a resource allocation module component implemented by the processor and memory, the resource allocation module implemented to perform operations that allocate the resources to meet resource demand from the projected queue, and calculate one or more times to allocate a resource session for an available resource;
wherein the resources are technical support agents and wherein the consumers are users seeking technical support from the technical support agents, wherein a respective agent of the technical support agents provides assistance to multiple of the users with concurrent technical support sessions to the multiple of the users in an online user interface; and
wherein the respective agents of the resources are scheduled to ensure assistance to the consumers based on time metrics including an average speed to answer, wherein the average speed to answer defines an average speed to begin a session between one of the technical support agents and one of the consumers.

17. The computing device of claim 16, further comprising:
a resource information data store, the resource information data store implemented to provide characteristics of the resources, including information for respective human support resources;
a consumer information data store, the consumer information data store implemented to provide characteristics of the consumers of the resources, including information for respective human users requesting support;
a predictive scenario data store, the predictive scenario data store implemented to provide estimated resource usage and characteristics of predictive future resource usage scenarios; and
a historical information data store, the historical information data store implemented to provide historical resource usage and resource usage statistics from past resource usage scenarios;
wherein operation of the regression analysis module includes use of performance of a regression equation on data from the predictive future resource usage scenarios and past resource usage scenarios.

18. The computing device of claim 16, comprising a resource scheduling module implemented by the processor and memory, the resource scheduling module implemented to schedule respective of the resources using the relationships obtained from among the variables of the regression analysis.

19. The computing device of claim 16, comprising a queue management module implemented by the processor and memory, the queue management module implemented to affect operations of a resource queue established for the concurrent technical support sessions, based on the average speed to answer.

20. The computing device of claim 16, comprising a user interface module implemented by the processor and memory, the user interface module implemented to facilitate display operations and control of respective online technical support sessions between a particular technical support agent and a particular user.

21. The computing device of claim 16, comprising a resource analytics module implemented by the processor and memory, the resource analytics module implemented to provide representations of data that indicate the allocation of the resources to meet resource demand, the representations of data including a representation of the average speed to answer.

* * * * *